(12) United States Patent
Marquette et al.

(10) Patent No.: US 8,001,709 B2
(45) Date of Patent: Aug. 23, 2011

(54) DATA DEVICE TO SPEECH SERVICE BRIDGE

(75) Inventors: Brian Marquette, Lafayette, CO (US); Chris Kramp, Boulder, CO (US); Swavek Skret, Boulder, CO (US)

(73) Assignee: NVOQ Incorporated, Boulder, CO (US)

( * ) Notice: Subject to any disclaimer, the term of this patent is extended or adjusted under 35 U.S.C. 154(b) by 3077 days.

(21) Appl. No.: 10/334,872

(22) Filed: Dec. 31, 2002

(65) Prior Publication Data

US 2004/0125794 A1 Jul. 1, 2004

(51) Int. Cl.
*H04L 12/66* (2006.01)
*G10L 15/26* (2006.01)
*H04M 3/42* (2006.01)

(52) U.S. Cl. .................. 37/355; 379/201.01; 704/235

(58) Field of Classification Search .................. 704/235; 370/352–356, 395.52; 379/201.01
See application file for complete search history.

(56) References Cited

U.S. PATENT DOCUMENTS

| 6,385,586 | B1 | 5/2002 | Dietz |
| 6,616,700 | B1 | 9/2003 | Thum et al. |
| 6,724,403 | B1 | 4/2004 | Santoro et al. |
| 6,816,486 | B1 | 11/2004 | Rogers |
| 6,820,055 | B2 * | 11/2004 | Saindon et al. ............... 704/235 |
| 2003/0088421 | A1 * | 5/2003 | Maes et al. ................. 704/270.1 |

* cited by examiner

*Primary Examiner* — Harry Hong
(74) *Attorney, Agent, or Firm* — Holland & Hart, LLP

(57) ABSTRACT

The present invention provides a data device to speech service bridge. The bridge allows packet-based devices, such as, for example, the PDA and 2.5/3G cellular phone, to access voice services.

9 Claims, 6 Drawing Sheets

DATA DEVICE TO SPEECH SERVICE BRIDGE

RELATED APPLICATIONS

This application is related to U.S. patent application Ser. Nos. 09/965,057, titled MEDIA SESSION FRAMEWORK USING A CONTROL MODULE TO DIRECT AND MANAGE APPLICATION AND SERVICE SERVERS, filed Sep. 26, 2001, incorporated herein by reference, and 10/113,853, titled PROTOCOL INDEPENDENT CONTROL MODULE, filed Mar. 29, 2002, incorporated herein by reference (collectively referred to as the "Related Applications").

FIELD OF THE INVENTION

The present invention relates to delivery of applications and services and, more particularly, delivery of voice activated applications and services to packet based data devices using a data device to speech service bridge.

BACKGROUND OF THE INVENTION

Applications today generally constitute two types of services: voice applications and data applications. Voice applications are conventionally access using a telephone, for example. Data applications are conventionally access using a graphical user interface, such as, for example, a web browser.

Referring to FIG. 1, a legacy telephony service system 100 for accessing voice applications is shown. As shown, system 100 includes a telephone 102, the public switch telephone network (PSTN) 104, and voice applications, such as, for example, an integrated voice response application 106 and a voice service 108. Generally, a user would dial the desired voice application, such as a weather service, using telephone 102. The voice application may provide a menu of choices using an audio signal that a user selects using various touch-tone buttons on telephone 102. Based on the users choices, the voice application may provide local whether for Boston, Mass. Some voice applications include access to an automatic speech recognition process, which allows the user to speak responses instead of using the touch-tone buttons.

Using the PSTN 104, the user accesses the voice application using the circuit-switch network and a wire (or wireless) telephone connection. PSTN 104 accesses the voice applications using a physical voice line, also. Input to and output from the voice applications occurs over the voice line, and the systems do not provide any data interface to the service.

The legacy telephony service system 100 has several drawbacks. In particular, the legacy telephony service system 100 has five major drawbacks. First, conventionally proprietary hardware hosts the integrated voice response applications 106 and voice services 108. The proprietary hardware can map audio data between voice circuits and digital audio circuits. The proprietary hardware inhibits interaction between diverse systems. Second, switching between the PSTN and the network components is difficult and complex. This difficult is due, in large part, to the difference between the binary circuit-switched protocols, such as, for example, ISDN, CAS, or SS7, of the PSTN to the packet based protocols of the network components. Third, access to the application and services must be tailored to the application programming interfaces (API) provided by the hardware vendor, which are not standardized. Fourth, packet based devices cannot access the service because they cannot interface with the PSTN network. Fifth, packet based devices cannot access resources, such as speech recognition or text-to-speech processors.

Referring now to FIG. 2, a conventional packet based data network 200 is shown. As will be explained, data network 200 resolves some of the drawbacks associated with legacy system 100. Data network 200 includes the telephone 102, PSTN 104, and voice service 208, such as, for example, automatic speech recognition (ASR) or text-to-speech processors. In order to convert signals between PSTN and a packet based voice service 208, a media gateway 210 is interspersed between PSTN 104 and packet based voice service 208. An exemplary media gateway is disclosed in the Related Applications, which are identified above. Similar to legacy system 100 above, data network 200 vertically integrates the voice services. Thus, access to, for example, speech recognition or text-to-speech services is limited to programming APIs through the voice service runtime.

Even with the mentioned drawbacks, the switch from legacy system 100 to Voice over IP (VoIP) data network 200 addressed some of the legacy system issues. In particular, media gateway 210 provides a generic or standard interface between voice circuits and digital audio circuits allowing use of diverse off the shelf hardware. Also, media gateway 210 can provide signal conversion from PSTN protocols to packet system protocols, such as, for example conversion from ISDN-PRI to SIP.

While initial data networks 200 solved two basic issues, the vertical integration of data network 200 still required access to voice services through a single vendor API, which required specific programming to the vendors API protocols. Standardize API programming tool such as VoiceXML and Speech Application Language Tags ("Salt") have improved interoperability between diverse vendors. But because the runtime vendor control access to the media resources, interoperability with media resources between vendors is generally not available.

A component server architecture 300 shown in FIG. 3 addresses the vertical integration issue. In particular, architecture 300 includes access to the media gateway 210, which is typically via a telephone, but as described in the Related Applications, can be a number of devices. Media gateway 210 converts the request into a packet based request, such as a SIP packet, and directs the request to a voice service runtime interface 312. Voice service runtime interface 312 is connected to voice services, such as, for example, speech recognition resource 314, text-to-speech resource 316, and streaming media resource 318.

In this case, because the media path is not along a physical voice line (wireless or wire based), the user input audio can be streamed directly to speech recognition resource 314. Moreover, the audio output of text-to-speech resource 316 can be streamed directly to the user (in this case through media gateway 210 to provide the packet based to switched circuit conversions).

Locating voice service runtime interface 312 as a separate component allows seamless interoperation with diverse media resources. The seamless operation is allowed because the vendor specific APIs are abstracted by the component framework of system 300. The following example demonstrates the abstracting of vendor specific APIs. Assume both vendor X and vendor Y provide text-to-speech resources. Vendor X uses a C-based API and vendor Y uses a Java based API. Front loading vendor X and vendor Y's resource with, for example, a SIP/RTP agent allows vendor X's resource and vendor Y's resource to be used without regard to the specific API because the request is send in a SIP/RTP protocol that is converted to the appropriate API by the front loaded SIP/RTP agent. Thus, each resource and service in the network can be provided by different vendors without regard for the vendor specific API, which allows a best of breed approach to deploying services.

In other words, each vendor specific component is provided with an access agent of sorts that interfaces between the network and the component. The access agent converts a packet based standard protocol to the vendor specific protocol for the component.

Even though the component based architecture solves many drawbacks, conventional systems do not adequately provide solutions for the last two major drawback of legacy system 100. Thus it would be desirous to develop a data access to speech service bridge that would allow packet based devices to access the services, and packet based devices to access resources, such as speech recognition and text-to-speech resources.

SUMMARY OF THE INVENTION

To attain the advantages of and in accordance with the purpose of the present invention, a method for accessing telephony services and resources by handheld packet enabled devices is provided. The method comprises providing at least one communication link between at least one packet enabled data device and at least one bridge. The bridge receives at least one command from the device over the communication link that is mapped to a standardized protocol. A resource is queued based on the command and a call session between the device and resource is established. The request is then transmitted to the resource for processing.

The present invention also provides apparatuses for accessing telephony services and resources by handheld packet enabled devices. The apparatus comprises a data device communicator having at least one access port adapted to receive data from at least one data device. A command bridge is connected to the data device communicator for receiving and mapping a command to a standardized protocol. A resource termination is connected to the command bridge and is adapted to transmit data to a resource.

The foregoing and other features, utilities and advantages of the invention will be apparent from the following more particular description of a preferred embodiment of the invention as illustrated in the accompanying drawings.

BRIEF DESCRIPTION OF THE DRAWING

The above and other objects and advantages of the present invention will be apparent upon consideration of the following detailed description, taken in conjunction with the accompanying drawings, in which like reference characters refer to like parts throughout, and in which.

DETAILED DESCRIPTION

As mentioned above, VoIP systems and legacy systems provide reasonable access to voice services and the like for telephones, cellular phones (using traditional wireless protocols), and the like. However, data devices, such as personal digital assistance (PDAs), some personal computers, newer cellular phones that use packet based protocols, such as 2.5/3G cellular phones, and the like cannot readily access voice services. Referring now to FIGS. 4-7, an embodiment of a data device to speech service bridge will described that allows data devices to access speech services.

Generally, packet-based devices, such as PDAs, access services and applications through two methods. First, the PDA can download an executable file from a server and run the application or service locally. Second, the application can stream to the PDA over a wireless data network, which typical involves data transfer protocols such as Short Messaging System (SMS), Wireless Access Protocol (WAP), or the like. It can be appreciated, however, that voice services do not translate well to packet based systems.

Figure 1:
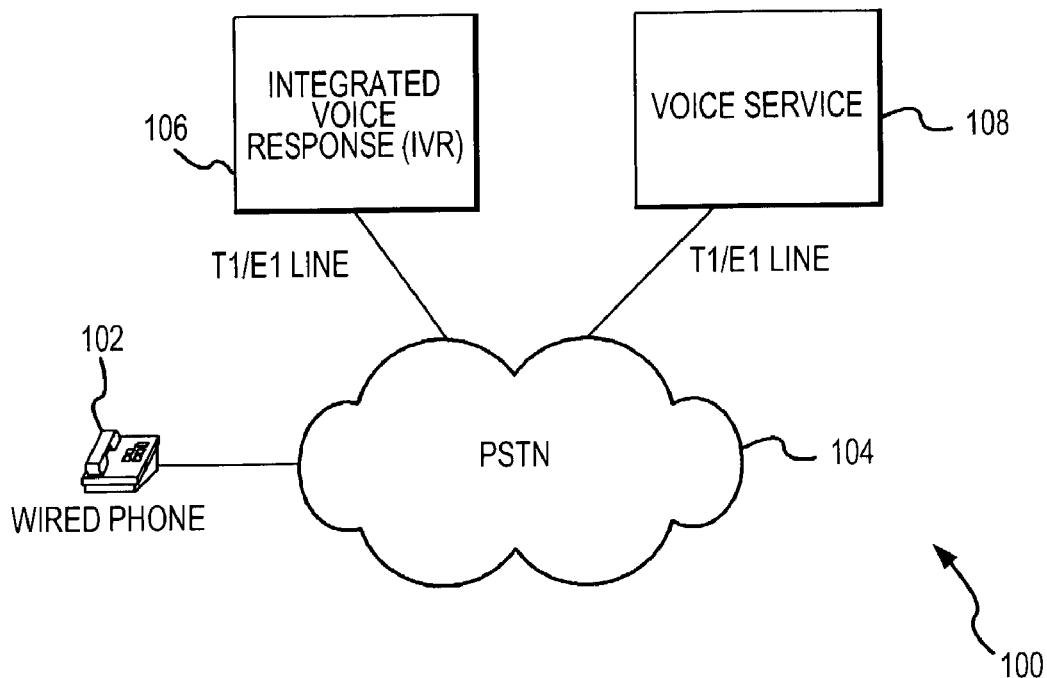
FIG. 1 is a functional block diagram of a legacy telephone system.
Figure 2:
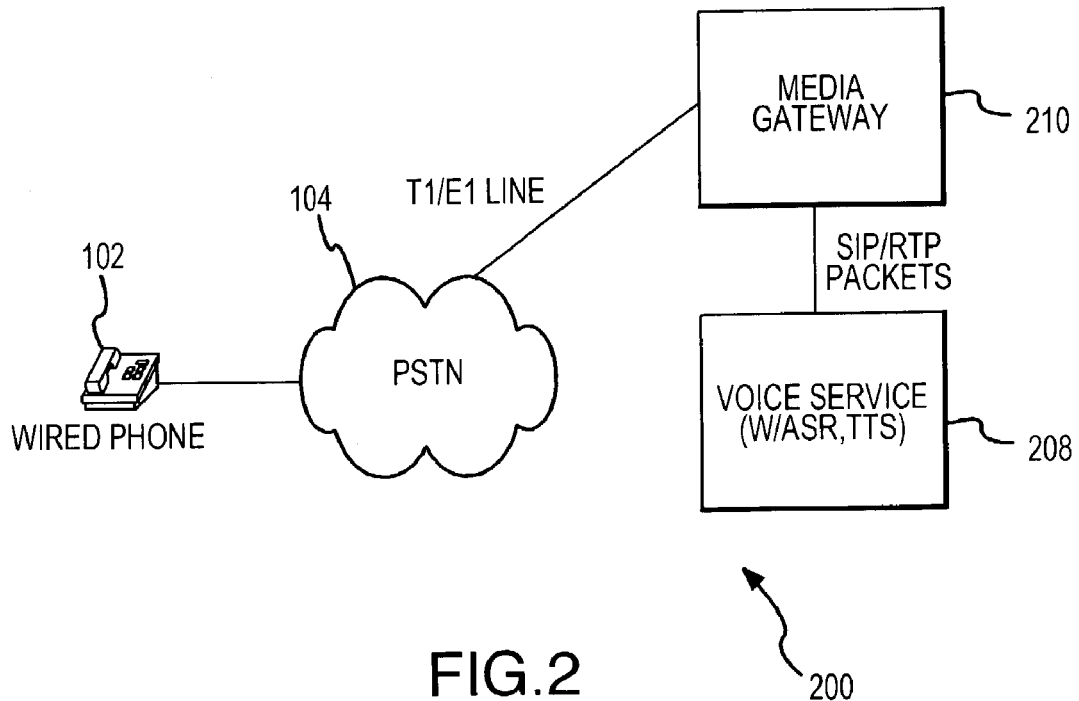
FIG. 2 is a functional block diagram of a data network using the legacy telephone system of FIG. 1.
Figure 3:
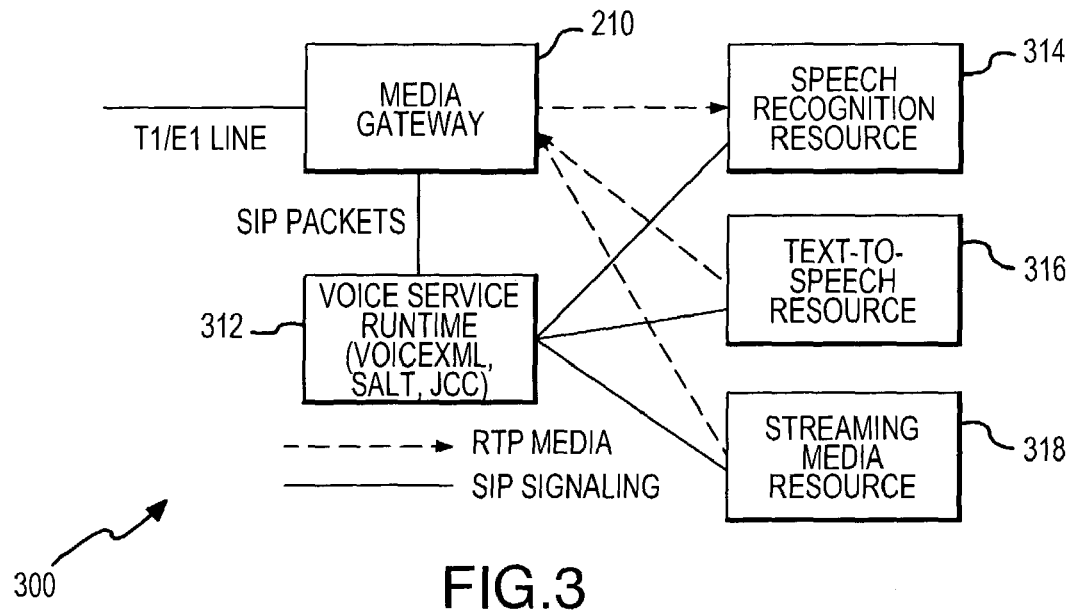
FIG. 3 is a functional block diagram of a component server architecture associated with a data network and legacy telephone system.
Figure 4:
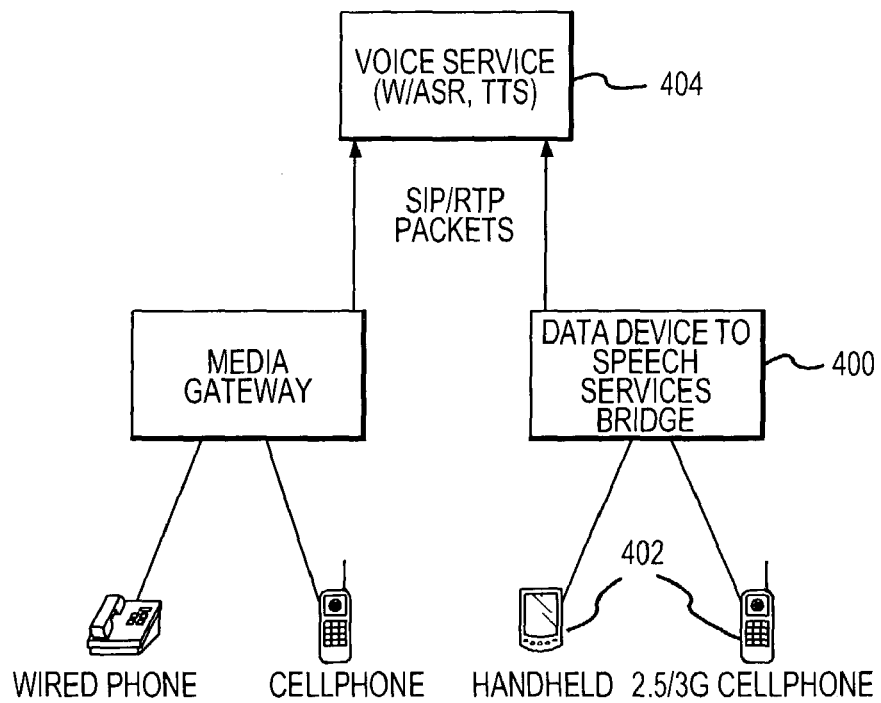
FIG. 4 is a functional block diagram of a data device to speech service bridge consistent with the present invention.

Referring now to FIG. 4, a data device to speech service bridge 400 is shown. The bridge 400 allows packet-based devices 402, such as, for example, the PDA and 2.5/3G cellular phone shown, to access voice services 404. Packet-based device 402 are shown as wireless in this case, but could be connected to bridge 400 via other methodologies. It should be noted that at present some packet enabled devices have access to voice services. The dual enabled devices (packet and voice enable) require both packet-based protocols, such as WAP, and voice path protocols, such as ISDN. Bridge 400 allows a packet device to access the voice services without requiring the packet based device to have the voice path parts or protocols, which reduce device costs.

Figure 5:
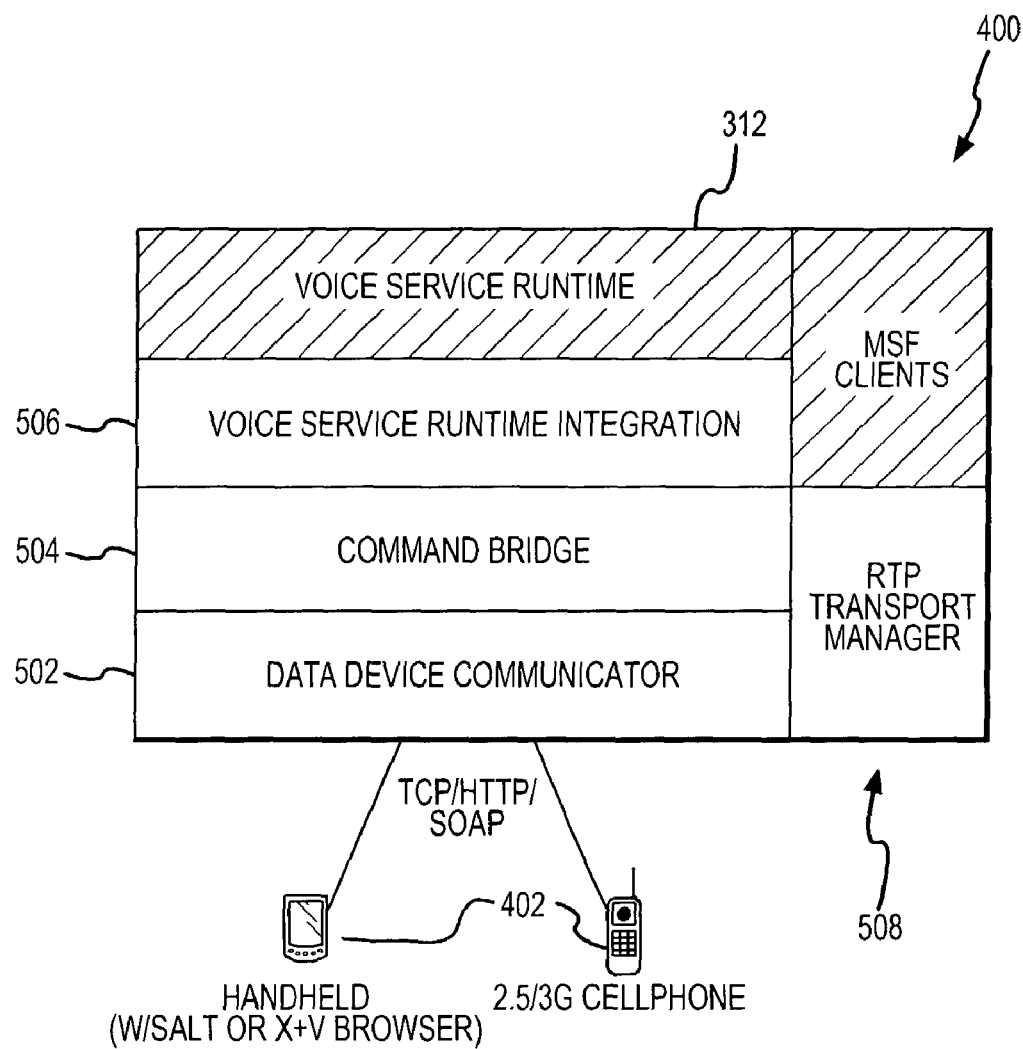
FIG. 5 is a representation of a data device to speech service bridge consistent with the present invention.

Referring now to FIG. 5, specific components forming one possible data device to speech service bridge 400 is provided. Bridge 400 includes a data device communicator 502, a command bridge 504, a voice service runtime integration 506, and a termination 508. FIG. 5 further shows voice service runtime 312 integrated with bridge 400. For simplicity, termination 508 will be discussed using SIP and RTP protocols. Notice, while shown as distinct devices for ease of reference, the parts making up bridge 400 as shown in FIG. 5 could be comprised of several separate processors or integrated on one processor. Also, the current embodiment contemplates building the various components using software modules, components, and routines, but one of skill in the art would recognize on reading the disclosure that the software components could be replaced with equivalent hardware or a combination of hardware and software.

Data device communicator 502 provides a communication interface to data device 402. Data device communicator 502 could be based on various transmission protocols based on the particular implementation and is largely a matter of design choice. Some protocol examples include transmission control protocols (TCP/IP), hypertext transfer protocols (HTTP), simple object access protocol (SOAP), and the like.

Data device communicator 502 has a predefined port address, such as a universal resource locator for Internet applications, although one of skill in the art will recognize other protocols for port addresses associated with local area networks, wide area networks, other web based protocols or the like are possible. Thus, data device 402 interfaces with data device communicator 502 by identifying and connecting to an available port that supports the appropriate protocol for data device 402. After appropriate handshaking, data device 402 can issue commands to data device communicator 502.

The interface will accept both high and low level resource-based commands, such as, for example, speech application language tags (SALT), XHTML plus Voice XML (X+V), or the like.

In operation, data device communicator 502 not only accepts commands from data device 402, but also handles media transfer to and from the device. In particular, many handheld data device have a small footprint making the conversion of media formats infeasible or at the least difficult. Thus, data device communicator 502 can be configured to translate the data device protocol to the appropriate network speech resource protocol.

Command bridge 504 receives the commands (low or high level resource commands) from data device communicator 502. Low level resource commands are mapped to a media session framework client through the MSF portion of termination 508. Command bridge 504 maps return prompts from the MSF clients to data device 402 via data device communicator 502. Types of MSF clients include queues for an audio prompt, queues for text to speech conversion, queues for playing audio and text-to-speech prompts, and the like. Return prompts include playing of in progress text to speech, playing of complete text to speech, loading of speech recognition grammar, and the like. High level resource commands are mapped to voice service runtime integration 506.

Termination 508 provides SIP and RTP termination for media session framework clients. The SIP and RTP termination for MSF clients is explained in detail in the Related Applications. Basically, SIP provides call session management and RTP provides data transmission protocols. In operation, which will be further explained in connection with flowchart 700 below, the bridge provides a mechanism by which packet-based data devices can access and receive data from speech or voice applications and services. In particular, termination 508, which may be an RTP manager, receives media being sent to the data device. Data device communicator 502 and transmitted to data device 402 using the appropriate protocols organizes the packets received by termination 508. Similarly, media is transmitted from the packet based data device 402 using termination 508.

While the MSF clients and termination 508 can execute low level commands, voice service runtime integration 506 executes high level commands, which are typically a bundling of one or more low level commands. Voice service runtime integration 506 operates using various protocols, such as, for example, the X+V protocol, above.

Figure 6:
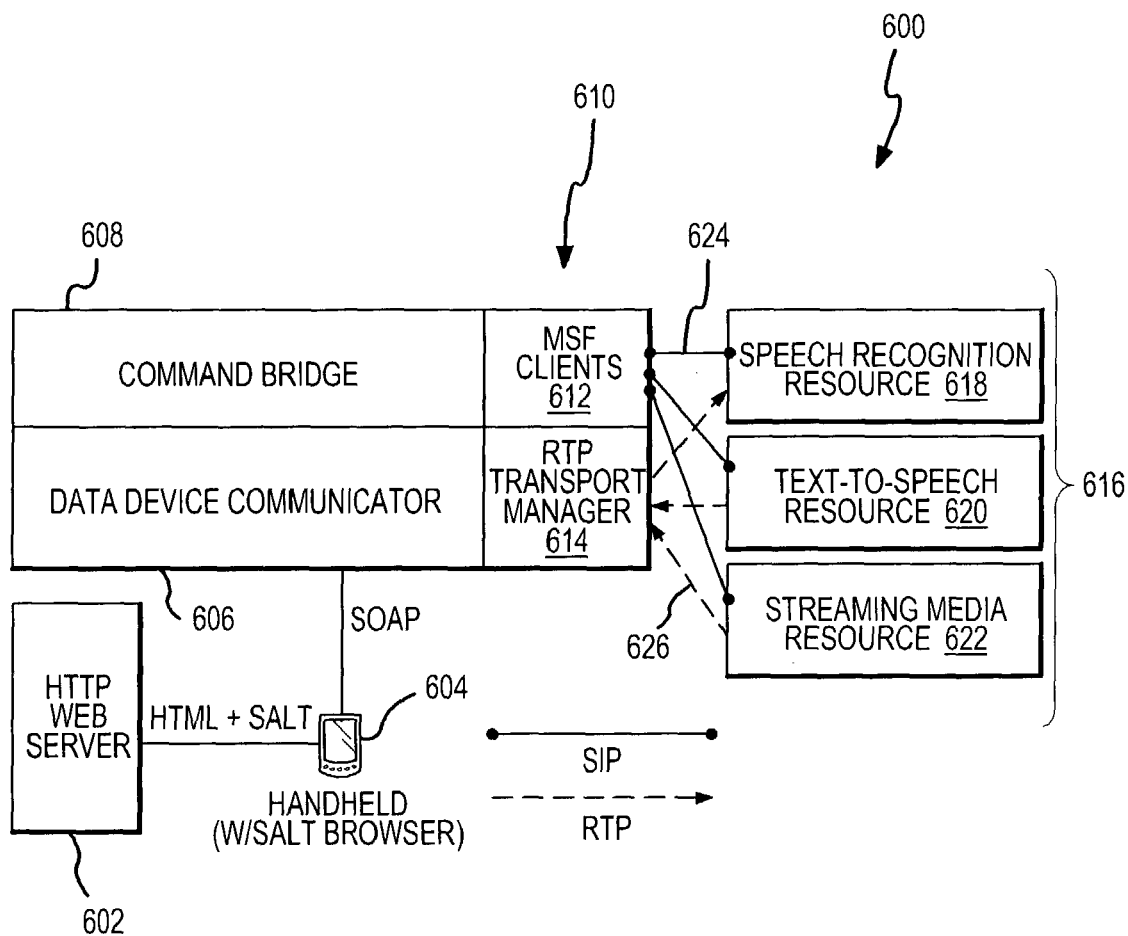
FIG. 6 is a functional block diagram of a component server architecture consistent with the present invention.

FIG. 6 shows a simplified architecture 600 illustrative of an embodiment of the present invention. Architecture 600 includes a server 602, which could be a conventional web based service, a local area network server, a wide area network server, or the like, a packet based data device 604, such as a PDA using HTML and SALT protocols, a data device communicator 606, which may interface with data device 604 using SOAP protocols, a command bridge 608, termination 610, which has MSF client locator 612 and RTP transport manager 614. Applications and services 616, such as speech recognition resource 618, text-to-speech resource 620, and streaming media resource 622 are connected to MSF client locator 612 by data links 624 and connected to RTP transport manager 614 by data links 626. Data links 624 and 626 are conventional data links and can include cable connections, fiber optic connections, wireless connections, or the like. Not shown in FIG. 6 are a voice service runtime integration and/or voice service runtime. One of skill in the art would now recognize, however, that those components could be included.

Figure 7A:
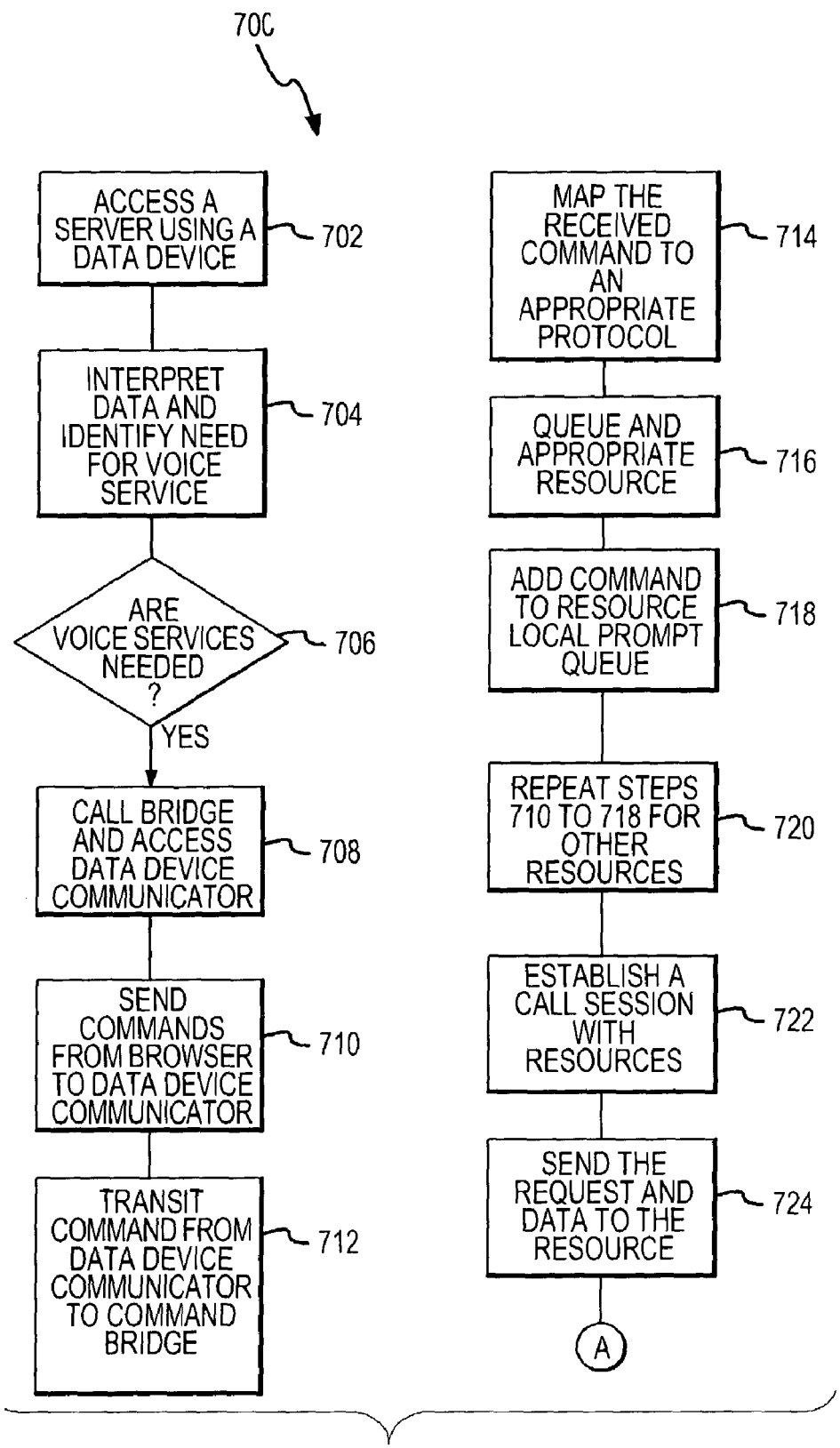
FIG. 7 is a flowchart illustrative of a methodology consistent with the present invention.
Figure 7B:
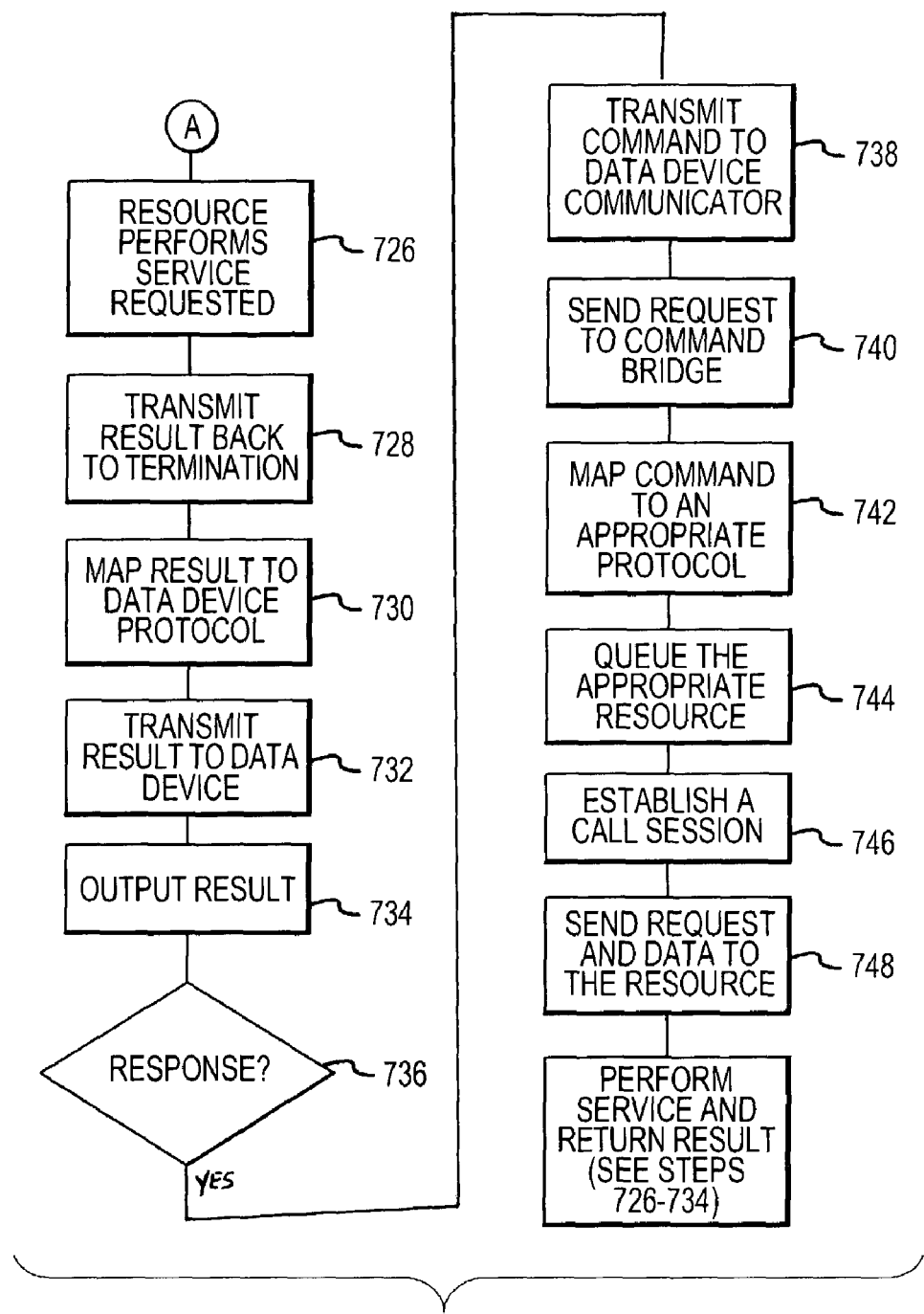

FIG. 7 is a flowchart 700 showing operation of architecture 600. The function with relation to voice service runtime integration and voice service runtime would be similar to that described in flowchart 700 and will not be further explained.

The process is initialized when data device 604 accesses server 602, step 702. The browser associated with data device 604 interprets the data contained on server 602 and identifies the need for voice services, such as by reading SALT tags in a HTML document, step 704. Based on the identification, the browse determines whether voice services are needed, step 706. For example, a text to speech command may need to be played during the display of the visual HTML document. If voice services are needed, the data device calls the bridge and accesses data device communicator 606, step 708. Once a connection between the data device and the data device communicator is established, the browser sends, for example, a low level text to speech queue command to the communicator, step 710. The data device communicator receives the low level command transmits the command to the command bridge, step 712.

To execute the command, the command bridge maps the command to, for example, a SIP protocol, step 714, and directs the media session framework client to queue the text associated with the text to speech command, step 716. On receiving the command, the text to speech resource would add the command to a local prompt queue object, step 718. Next, the play commands would be directed to appropriate media session framework resource clients, step 720 (which step is similar to the above and not repeated).

Once the commands are in place, MSF client portion 612 of termination 610 establishes a SIP session, step 722. The text to speech resource begins the SIP session by establishing an RTP host and port to which all audio is streamed. The resource then sent the request with the text to play, step 724. The text to speech resource receives the request and text to play and converts it to an audio signal, step 726. The audio signal is then transmitted to the termination, via RTP transport manager portion 614, step 728. The command bridge converts the audio signal to the appropriate protocol, step 730, and sends to the data device through the data device communicator, step 732, and the user hears the audio prompt at the device, step 734.

After the audio output, it is determined whether a response to the output is required, step 736. Assuming the audio prompt requires an audio response, although one of skill in the art would recognize may responses may be prompted, the browser would transmit a low level command to the data device communicator to queue a grammar resource, such as speech recognition, step 738. The data device communicator would send the request to the command bridge, step 740, and the command bridge would map the command to the media session framework termination, step 742, that queues a media session framework client to load and activate the grammar resource, step 744. A media session is then established, as discussed above, step 746, and the request is sent to the resource, step 748. The resource performs the service and returns a result, step 750. Thus, using the bridge allows packet based data devices to access voice based services.

In the case of a voice response, the user may begin speaking, which may include a triggering event such as pressing a button. In this case, a start recognition command is sent to the resource. The data device records and transmits the voice response using its normal packet based delivery system, and the bridge streams the voice input to the recognition resource using established RTP ports. The result is returned to the bridge, which sends the result to the data device to be, for example, displayed by the data device, step Thus, using the bridge allows packet based data devices to access voice based services.

While the invention has been particularly shown and described with reference to an embodiment thereof, it will be understood by those skilled in the art that various other changes in the form and details may be made without departing from the spirit and scope of the invention.

We claim:

1. A method for accessing telephony services and resources by packet enabled devices, comprising the steps of:
   accessing at least one data document on a network by a browser on a packet enabled device;
   downloading the at least one data document from the network to the packet enabled device;
   identifying by the packet enabled device at least one resource required to display the at least one data document on the packet enabled device;
   establishing a communication link between the packet enabled device and a bridge;
   transmitting a command from the packet enabled device to the bridge for access to the at least one resource identified by the packet enabled device;
   mapping the transmitted command to a standardized protocol command;
   establishing at least one call session between the bridge and the at least one resource;
   sending the standardized protocol command to the at least one resource;
   processing data at the at least one resource based on the standardized protocol command;
   returning the processed data to the bridge;
   mapping the processed data into a protocol usable by the packet enabled device; and
   outputting the processed data in the protocol usable by the packet enabled device from the bridge to the packet enabled device; and
   displaying the data document.

2. The method of claim 1, wherein the at least one data document includes audio data, and wherein the command includes a request for text to speech resources and the audio data, and wherein the processed data includes audio, and wherein the displayed data document includes the audio.

3. The method according to claim 1, wherein the at least one resource comprises at least two resources.

4. The method according to claim 1, wherein the mapping step maps to a session initiation protocol for call control and to a realtime transport protocol for media transport.

5. The method according to claim 1, wherein the at least one resource comprises voice services.

6. The method according to claim 5, wherein the voice services comprise at least one of speech recognition resources and text to speech resources.

7. The method according to claim 1, wherein the communication link uses at least one of simple object access protocols, hypertext transfer protocols, and transmission control protocols.

8. The method according to claim 1, where the data document uses hypertext transfer protocols.

9. The method according to claim 8, wherein the hypertext transfer protocols include speech application language tags.

* * * * *